United States Patent

Lao

(10) Patent No.: US 8,092,033 B2
(45) Date of Patent: Jan. 10, 2012

(54) ILLUMINATION ASSIST DEVICE AND ELECTRONIC DEVICE USING THE SAME

(75) Inventor: Po-Chao Lao, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 318 days.

(21) Appl. No.: 12/463,498

(22) Filed: May 11, 2009

(65) Prior Publication Data

US 2010/0118544 A1   May 13, 2010

(30) Foreign Application Priority Data

Nov. 12, 2008 (CN) .......................... 2008 1 0305512

(51) Int. Cl.
*F21V 11/00* (2006.01)
(52) U.S. Cl. ......................................... 362/16; 362/355
(58) Field of Classification Search .................. 362/355, 362/16–18, 277, 307–308, 309–310, 311.01–311.02, 362/311.04, 3; 396/544–545
See application file for complete search history.

(56) References Cited

U.S. PATENT DOCUMENTS

| 4,610,525 A * | 9/1986 | Yoshida et al. | 396/157 |
| 7,748,875 B2 * | 7/2010 | Fong | 362/355 |
| 7,819,559 B2 * | 10/2010 | Nishihara et al. | 362/333 |
| 2007/0165414 A1 * | 7/2007 | Shei et al. | 362/362 |

FOREIGN PATENT DOCUMENTS

JP         2004171820 A  *  6/2004

* cited by examiner

*Primary Examiner* — Robert May
(74) *Attorney, Agent, or Firm* — Altis Law Group, Inc.

(57) ABSTRACT

An illumination assist device used for an electronic device having a flash lamp includes an optical plate and a cover. The optical plate is positioned between the flash lamp and the cover. The cover includes a light transmission board and a plurality of reflection sidewalls extending from a periphery of the light transmission board. The optical plate is surrounded by the plurality of reflection sidewalls. The invention also provides an electronic device using the illumination assist device.

10 Claims, 3 Drawing Sheets

ILLUMINATION ASSIST DEVICE AND ELECTRONIC DEVICE USING THE SAME

BACKGROUND

1. Technical Field

The present disclosure relates to illumination assist devices, and particularly, to an illumination assist device used in an electronic device.

2. Description of Related Art

Electronic devices, such as cell phone and personal digital assistant (PDA), have become increasingly popular in recent years. Such electronic devices are usually carried by users at all time for them convenience and multifunction capabilities. Although the electronic devices provide many different features, other external devices may also be applied to work with the electronic devices to provide more features. For instance, the user may wish to use the electronic device to perform tasks that require an additional lighting, such as functions of a flashlight.

A typical electronic device includes a housing, a light emitting diode (LED) positioned in the housing for lighting, a battery to provide power to the LED, and a switch to control the LED. However, the LED of the electronic device has a poor brightness.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
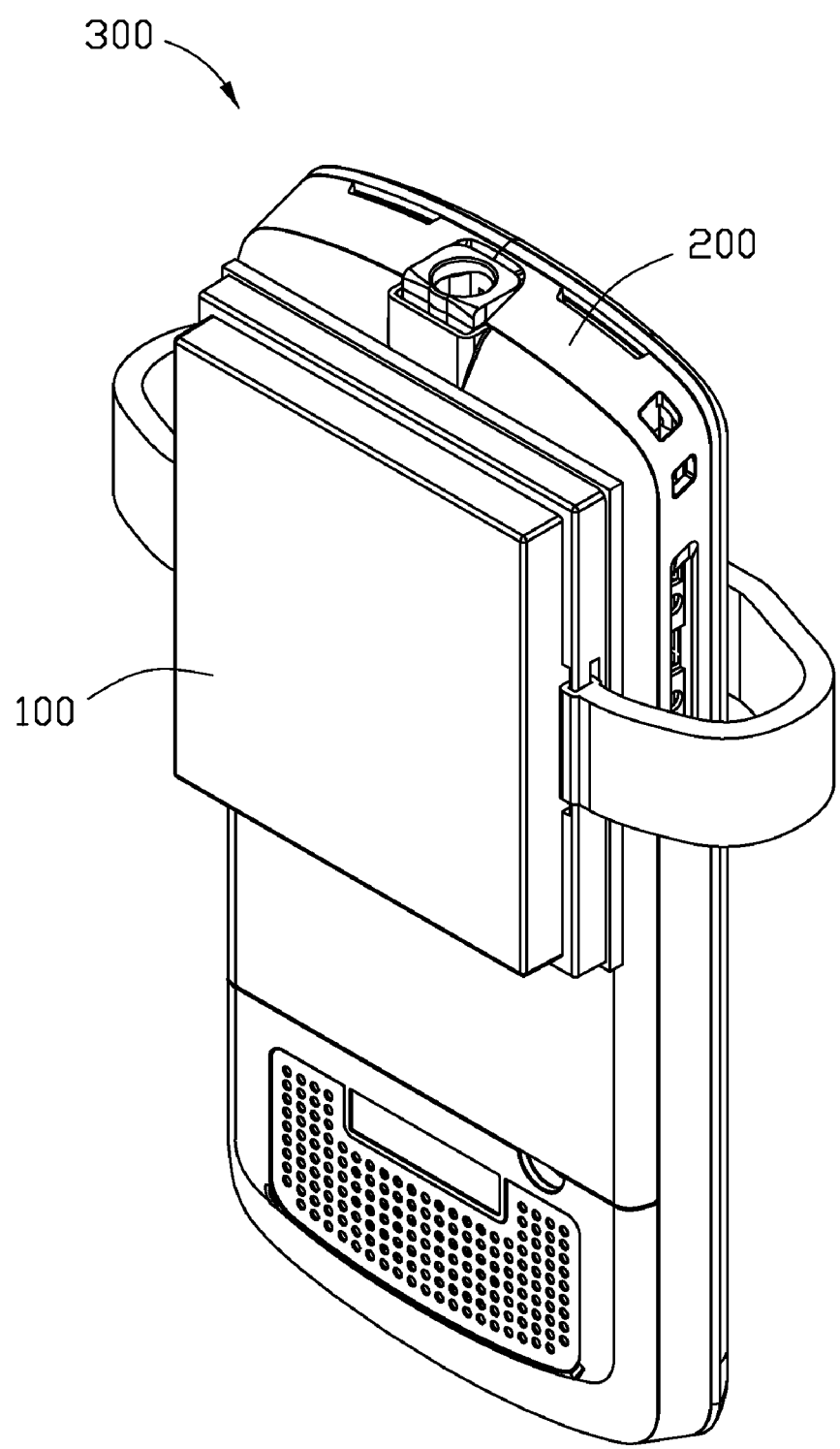
FIG. 1 is an isometric view of an embodiment of an electronic device, the electronic device including an illumination assist device.
Figure 2:
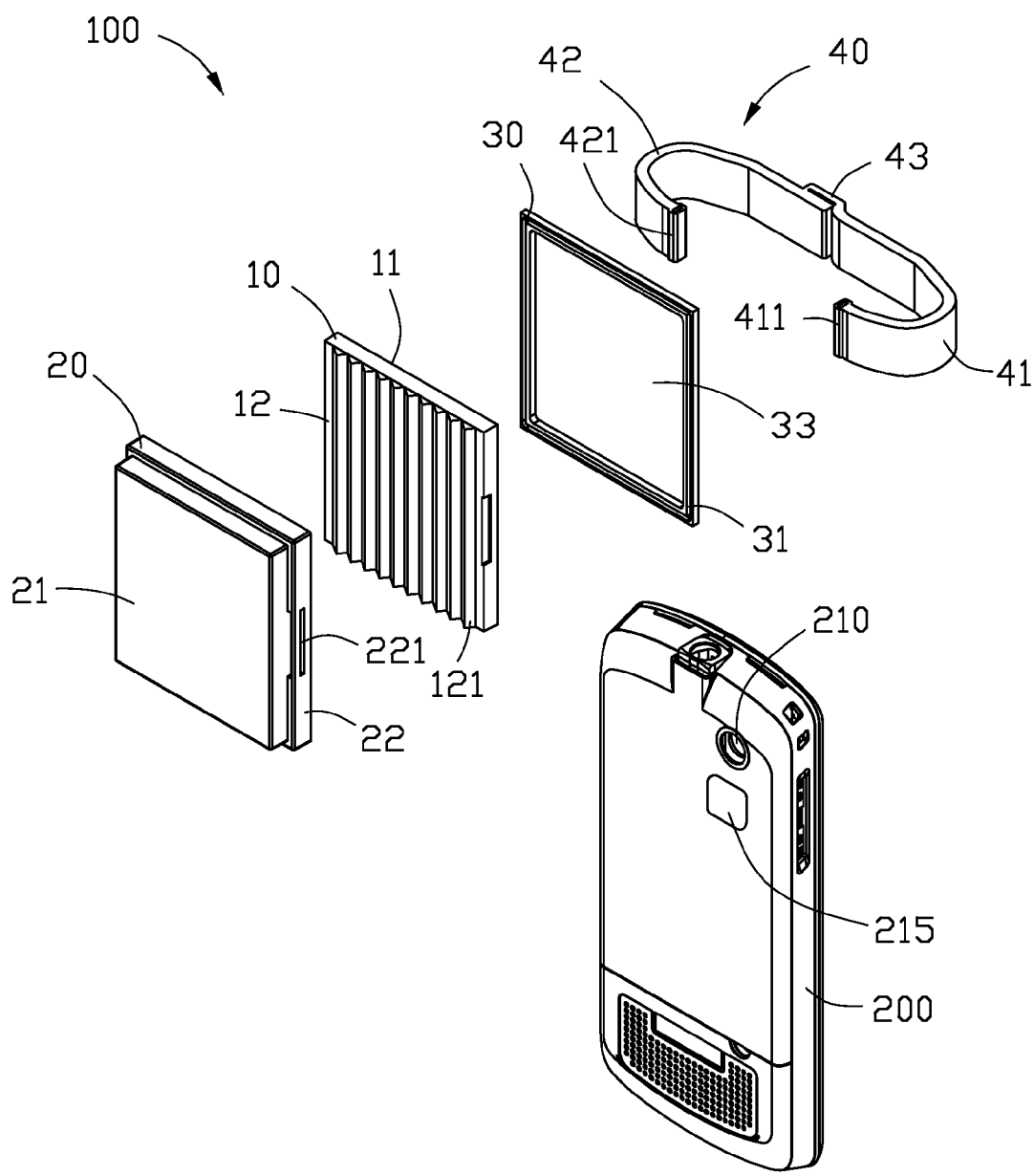
FIG. 2 is an exploded, isometric view of the electronic device shown in FIG. 1.

FIGS. 1 and 2 show an exemplary electronic device 300 includes an illumination assist device 100 and a main body 200. The electronic device 300 includes a camera 210 positioned in the main body 200 and a flash lamp 215 positioned in the main body 200 adjacent to the camera 210. The flash lamp 215 is used to provide flash lighting for photography. In this embodiment, the electronic device 300 is a mobile phone, and the flash lamp 215 is a xenon photoflash. The flash lamp 215 can also function as a flashlight, where the flash lamp 215 can be powered on constantly. The illumination assist device 100 includes an optical plate 10, a cover 20, a frame 30, and a fixing member 40.

The optical plate 10 is substantially a rectangular cube, and is made of transparent materials, such as polymethyl methacrylate (PMMA), polycarbonate (PC), polystyrene (PS), copolymer of methylmethacrylate and styrene (MS), and any suitable combinations thereof. The optical plate 10 includes a light input surface 11, a light output surface 12 opposite to the light input surface 11, and a plurality of parallel V-shaped protrusions 121 extending outward from the light input surface 11. Each V-shaped protrusion 121 has a triangular cross-section taken along a line parallel to the light input surface 11. Each cross-section of the protrusions 121 has a vertex angle in a range of about 60 degrees to 120 degrees. In this embodiment, the vertex angle is 90 degrees.

Figure 3:
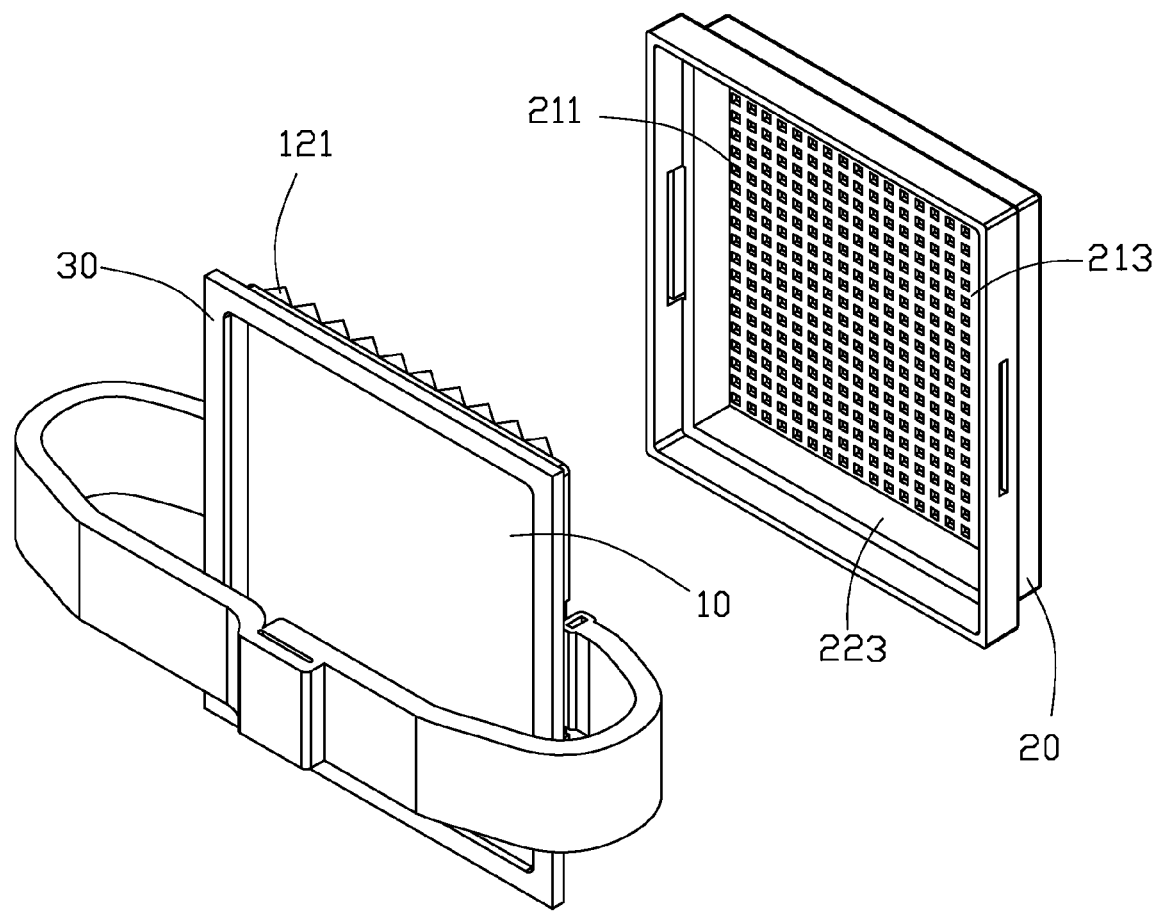
FIG. 3 is an enlarged, partial exploded, isometric view of the illumination assist device shown in FIG. 1, viewed from another aspect.

The cover 20 includes a substantially rectangular light transmission board 21 and four stepped reflective sidewalls 22 extending substantially perpendicularly from a periphery of the light transmission board 21 towards the optical plate 10. The light transmission board 21 is made of transparent materials, and is configured to protect the V-shaped protrusions 121 from being damaged. Referring to FIG. 3, the light transmission board 21 includes a plurality of rectangular depressions 211 defined in an inner surface 213 of the light transmission board 21. The rectangular depressions 211 are configured for guiding the light transmitted therethrough to an outside. The cover 20 has a high reflectivity film formed on inner surfaces 223 of the reflective sidewalls 22, so as to increase light energy utilization rate. The cover 20 further includes two through holes 221 defined at two opposite reflective sidewalls 22 for being assembled with the fixing member 40.

The frame 30 has the same shape as the reflective sidewalls 22, and includes a substantially rectangular groove 31 defined on a periphery thereof for receiving the reflective sidewalls 22. The frame 30 forms an opening 33 in a middle portion, and the opening 33 has a smaller dimension comparing to that of light input surface 11 of the optical plate 10.

The fixing member 40 includes a first belt 41, a second belt 42, and a hook-and-pile fastener 43. The first belt 41 includes a connecting end portion 411 for being fixed into one of the through holes 221 of the reflective sidewalls 22. Similarly, the second belt 42 includes a connecting end portion 421 fixed into the other through hole 221. The other ends of the first and second belts 41, 42 are fixed together by the hook-and-pile fastener 43. In the illustrated embodiment, the first belt 41 and the second belt 42 are made of canvas. It is to be understood that, the second belt 42 and the hook-and-pile fastener 43 may be omitted, as long as the other end of first belt 41 is directly connected to the other of the through holes 221, such that, the fixing member 40 can be fixed to the main body 200.

In assembling, firstly, the optical plate 10 is received in the cover 20 and surrounded by the reflective walls 22, and the plurality of parallel V-shaped protrusions 121 face the rectangular depressions 211. Secondly, the frame 30 is fixed to the cover 20, and the reflective sidewalls 22 engage with the groove 31. Because the dimension of the opening 33 is smaller than that of light input surface 11, the optical plate 10 is not able to pass through the frame 30, such that, the optical plate 10 is located in the cover 20. Lastly, the belt 41 and the belt 42 are connected to the two through holes 221 of the cover 20, respectively.

When a user needs a light source, the user can mount the illumination assist device 100 to the main body 200 by the first and the second belts 41, 42, wherein the light input surface 11 faces the flash lamp 215. When the flash lamp 215 is illuminated, the light emitted from the flash lamp 215 enters the optical plate 10 via the light input surface 11 and is substantially reflected by the reflective sidewalls 22 to an inside of the optical plate 10. Finally, the light is refracted at the V-shaped protrusions 121 and passes through the light transmission board 21 to provide illumination. When the user no longer desires a light source, the illumination assist device 100 can be unmounted from the main body 200.

One of the advantages of the electronic device 300 is that, the flash lamp 215 of the main body 200 can generate a relatively high brightness light with the assistance of the illumination assist device 100, without using any additional light sources. Another one of the advantages of the electronic device 300 is that it can provide an improve brightness of the flash lamp 215 at a specific range of viewing angles (e.g. perpendicular to the illumination assist device 100).

It is to be understood that, the reflective sidewalls 22 may be made of materials with a high reflectivity, such as aluminum or other metals.

The V-shaped protrusions 121 formed on the light output surface 12 of the optical plate 10 can be replaced by a plurality of cone-shaped protrusions or arcuate-shaped protrusions or spherical protrusions.

It is to be understood that, the frame 30 may be omitted, as long as the optical plate 10 is located in the cover 20 by welding or conglutinating.

It is to be understood that, the fixing member 40 may be omitted, as long as the illumination assist device 100 and the main body 200 are fixed together by conglutinating or other mechanisms such as bolting.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An illumination assist device used for an electronic device having a flash lamp, comprising:
    a cover;
    an optical plate located in the cover, wherein the cover further comprises a light transmission board, and a plurality of reflective sidewalls extending from a periphery of the light transmission board, the optical plate is surrounded by the plurality of reflective sidewalls;
    wherein the electronic device comprises a main body, and the illumination assist device further comprises a fixing member, the illumination assist device is fixed to the main body by the fixing member; the cover comprises two through holes defined at the plurality of reflective sidewalls, the fixing member comprises at least one belt connected to the plurality of reflective sidewalls by the through holes.

2. The illumination assist device of claim 1, wherein the plurality of reflective sidewalls comprises a high reflectivity film formed on inner surfaces thereof.

3. The illumination assist device of claim 1, wherein the optical plate further comprises a plurality of parallel V-shaped protrusions extending outward from a surface thereof, each V-shaped protrusion comprises a triangular cross-section taken alone a line parallel to the surface.

4. The illumination assist device of claim 3, wherein each cross-section of the protrusions comprises a vertex angle configured to be in a range of 60 degrees to 120 degrees.

5. The illumination assist device of claim 1, wherein the optical plate is made of a material selected from the group consisting of polymethyl methacrylate, polycarbonate, polystyrene, copolymer of methylmethacrylate and styrene, and any suitable combinations thereof.

6. The illumination assist device of claim 1, wherein the light transmission board has a plurality of depressions defined in an inner surface thereof.

7. The illumination assist device of claim 1, further comprising a frame for receiving the plurality of reflective sidewalls.

8. The illumination assist device of claim 7, wherein the frame forms an opening, the opening has a smaller dimension than a dimension of the optical plate.

9. The illumination assist device of claim 1, wherein the fixing member comprises a first belt, a second belt, and a hook-and-pile fastener, the first and the second belts are fixed together by the hook-and-pile fastener.

10. An illumination assist device used for an electronic device having a flash lamp, comprising:
    a cover;
    an optical plate located in the cover, wherein the cover further comprises a light transmission board, and a plurality of reflective sidewalls extending from a periphery of the light transmission board, the optical plate is surrounded by and located between the plurality of reflective sidewalls;
    wherein the electronic device comprises a main body, and the illumination assist device further comprises a fixing member, the illumination assist device is fixed to the main body by the fixing member; the cover comprises two through holes defined at the plurality of reflective sidewalls, the fixing member comprises at least one belt connected to the plurality of reflective sidewalls by the through holes.

* * * * *